US012609622B2

(12) United States Patent
Klien et al.

(10) Patent No.: US 12,609,622 B2
(45) Date of Patent: Apr. 21, 2026

(54) SWITCHED CONVERTER

(71) Applicant: Tridonic GmbH & Co KG, Dornbirn (AT)

(72) Inventors: Dietmar Klien, Mäder (AT); Miguel Philipp Schneider, Dafins (AT); Lukas Saccavini, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 18/727,139

(22) PCT Filed: Jan. 20, 2023

(86) PCT No.: PCT/EP2023/051403
§ 371 (c)(1),
(2) Date: Jul. 8, 2024

(87) PCT Pub. No.: WO2023/144037
PCT Pub. Date: Aug. 3, 2023

(65) Prior Publication Data
US 2025/0096689 A1 Mar. 20, 2025

(30) Foreign Application Priority Data

Jan. 26, 2022 (EP) ..................................... 22153359

(51) Int. Cl.
*H02M 3/335* (2006.01)
*H02M 3/00* (2006.01)
(Continued)

(52) U.S. Cl.
CPC .......... *H02M 3/3353* (2013.01); *H02M 3/01* (2021.05); *H05B 45/375* (2020.01); *H05B 45/38* (2020.01); *H05B 45/385* (2020.01)

(58) Field of Classification Search
None
See application file for complete search history.

(56) References Cited

U.S. PATENT DOCUMENTS 6,128,203 A * 10/2000 Canizales Teran ........................ H02M 3/33592
363/67
8,288,954 B2 * 10/2012 Melanson ......... H02M 3/33523
315/297
(Continued)

FOREIGN PATENT DOCUMENTS

DE 3705468 A1 10/1987
EP 4224688 A1 * 8/2023 .............. H02M 1/15
(Continued)

OTHER PUBLICATIONS

PCT/EP2023/051403, International Search Report and Written Opinion dated Mach 30, 2023, 7 pages.

*Primary Examiner* — Srinivas Sathiraju
(74) *Attorney, Agent, or Firm* — Andrus Intellectual Property Law, LLP

(57) ABSTRACT

The invention relates to a switched converter, comprising: at least one switch, output terminals for supplying an LED load, a capacitor arranged in parallel to the output terminals, a sensing transformer, a primary winding of the sensing transformer, a secondary winding of the sensing transformer; and a control circuitry controlling the operation of the at least one switch. The switched converter is configured to operate in alternating cycles between phases of supplying energy from a node on a potential of the at least one switch to the output terminals and phases of supplying energy to output terminals of the capacitor but not from said node. The primary winding of the sensing transformer is switched in series to the capacitor and the secondary winding of the sensing transformer is configured to generate an output signal supplied to the control circuity of the switched converter, wherein the control circuity is configured to sense the current flowing across the output terminals supplying the LED load based on said output signal.

16 Claims, 7 Drawing Sheets

(51) Int. Cl.
*H05B 45/375* (2020.01)
*H05B 45/38* (2020.01)
*H05B 45/385* (2020.01)

(56) References Cited

U.S. PATENT DOCUMENTS

| | | | | |
|---|---|---|---|---|
| 9,351,354 | B2 * | 5/2016 | Elferich | H05B 45/3725 |
| 10,285,231 | B2 * | 5/2019 | Schönberger | H05B 45/375 |
| 11,388,799 | B2 * | 7/2022 | Williams | H05B 45/325 |
| 11,540,371 | B2 * | 12/2022 | Zhu | H05B 45/14 |
| 11,564,299 | B2 * | 1/2023 | Li | H05B 45/34 |
| 11,570,859 | B2 * | 1/2023 | Zhu | H05B 45/10 |
| 11,638,335 | B2 * | 4/2023 | Zhu | H05B 45/345 |
| | | | | 315/297 |
| 11,695,401 | B2 * | 7/2023 | Zhu | H05B 45/395 |
| | | | | 315/291 |
| 11,784,638 | B2 * | 10/2023 | Zhu | H05B 45/395 |
| | | | | 315/291 |
| 11,856,670 | B2 * | 12/2023 | Li | H05B 45/395 |
| 11,937,350 | B2 * | 3/2024 | Zhu | H05B 45/345 |
| 11,997,772 | B2 * | 5/2024 | Zhu | H05B 45/14 |
| 12,009,825 | B2 * | 6/2024 | Zhu | H05B 47/20 |
| 2008/0224625 | A1 * | 9/2008 | Greenfeld | H05B 45/375 |
| | | | | 315/201 |
| 2011/0227492 | A1 * | 9/2011 | Du | H05B 45/14 |
| | | | | 315/219 |
| 2012/0187857 | A1 * | 7/2012 | Ulmann | H05B 45/3725 |
| | | | | 315/224 |
| 2014/0070727 | A1 * | 3/2014 | Pflaum | H05B 45/375 |
| | | | | 315/307 |
| 2014/0070728 | A1 * | 3/2014 | Pflaum | H05B 45/375 |
| | | | | 315/307 |
| 2014/0117868 | A1 * | 5/2014 | Lopez | H05B 45/3725 |
| | | | | 315/210 |
| 2014/0252973 | A1 * | 9/2014 | Liu | H02J 1/02 |
| | | | | 315/200 R |
| 2014/0301116 | A1 * | 10/2014 | Zhang | H02M 3/33523 |
| | | | | 363/21.15 |
| 2017/0025961 | A1 * | 1/2017 | Seeman | H02M 3/33546 |
| 2017/0063432 | A1 * | 3/2017 | Martin | H04B 5/266 |
| 2017/0244316 | A1 * | 8/2017 | Phadke | H02M 3/33523 |
| 2017/0311396 | A1 * | 10/2017 | Sadwick | F21K 9/27 |
| 2018/0063910 | A1 * | 3/2018 | Schönberger | H05B 45/10 |
| 2018/0152099 | A1 * | 5/2018 | Savic | H02M 3/156 |
| 2020/0251995 | A1 * | 8/2020 | Seeman | H02M 3/1584 |
| 2021/0135585 | A1 * | 5/2021 | Deng | H02M 3/33515 |
| 2021/0384849 | A1 * | 12/2021 | Xu | H02M 3/158 |
| 2022/0272812 | A1 * | 8/2022 | Netzer | H02M 3/156 |
| 2022/0312564 | A1 * | 9/2022 | Saccavini | H05B 45/385 |
| 2022/0329165 | A1 * | 10/2022 | Zou | H02M 3/33569 |
| 2022/0377860 | A1 * | 11/2022 | Auer | H05B 47/185 |
| 2023/0022357 | A1 * | 1/2023 | Chen | H02M 1/0009 |
| 2023/0030593 | A1 * | 2/2023 | Deng | H02M 3/33561 |
| 2023/0198392 | A1 * | 6/2023 | Yao | H02M 1/088 |
| | | | | 323/272 |
| 2025/0008622 | A1 * | 1/2025 | Kucera | H05B 45/305 |
| 2025/0063642 | A1 * | 2/2025 | Egle | H02M 3/01 |
| 2025/0096689 | A1 * | 3/2025 | Klien | H02M 3/33571 |

FOREIGN PATENT DOCUMENTS

| | | | | |
|---|---|---|---|---|
| EP | 3750229 | B1 * | 7/2024 | H02M 3/156 |
| WO | 2021212466 | A1 | 10/2021 | |

* cited by examiner

SWITCHED CONVERTER

CROSS REFERENCE TO RELATED APPLICATIONS

The present application is the U.S. national stage application of international application PCT/EP2023/051403 filed Jan. 20, 2023, which international application was published on Aug. 3, 2023 as International Publication WO 2023/144037 A1. The international application claims priority to European Patent Application No. 22153359.9 filed Jan. 26, 2022.

TECHNICAL FIELD OF THE INVENTION

The invention is generally in the area of switched converters for driving a LED load at output terminals of the switched converter.

BACKGROUND OF THE INVENTION

The use of LEDs in lighting applications is becoming always more and more important due to a rapid improvement in lighting efficiency, longer life, higher reliability, and overall cost effectiveness of the LEDs. Moreover, dimming functions are also more easily implemented in LEDs, they are more robust, and offer a wider design flexibility compared to other light sources.

In order to operate, LEDs are often supplied with current by a converter, such as a converter having a flyback topology, as shown in FIG. 1.

The converter shown in FIG. 1 is a special variant of a flyback converter and comprises a half-bridge, a resonant tank and an output circuit. The resonant tank is build up by a transformer main inductance Lm, a leakage inductance Llk and a resonance capacitor Cr connected in series to the transformer. Moreover, the flyback converter shown in FIG. 1 comprises a shunt resistor Rshunt for primary side current sensing of the converter and an output capacitor Cout.

A typical state of the art solution for sensing the LED current within the classical flyback topology makes use of a primary peak current which is sensed via a shunt resistor and a off time (Toff) of the switches of the converter. With this primary-side indirect sensing, there is no need for a secondary side current sensing. However, this method only works properly for the classic flyback-topology. Moreover, since the resonant flyback topology does not operate with triangular waveforms, the LED current cannot be calculated in an easy way on the primary side and, therefore, a secondary side current sensing is needed.

Therefore, depending on the given waveforms, the primary side sensing of the LED-current may not be possible, because the resonance-current on the primary-side makes a simple calculation of the LED current very difficult.

Furthermore, standard galvanically isolated sensing methods with current-transformer having a secondary side winding are too inaccurate (especially for dimming of the LED-current) at higher switching-frequencies due to the reverse recovery charge Qrr of the secondary side rectifier-diodes.

Thus, it is an objective to provide for an improved switched converter and method for sensing the current through a LED load.

SUMMARY OF THE INVENTION

The object of the present invention is achieved by the solution provided in the enclosed independent claims.

Advantageous implementations of the present invention are further defined in the dependent claims.

According to a first aspect of the invention, a switched converter is provided. The switched converter comprises at least one switch, output terminals for supplying an LED load, a capacitor arranged in parallel to the output terminals, a sensing transformer, a primary winding of the sensing transformer, a secondary winding of the sensing transformer, and a control circuitry controlling the operation of the at least one switch. The switched converter is configured to operate in alternating cycles between phases of supplying energy from a node on a potential of the at least one switch to the output terminals and phases of supplying energy to output terminals of the capacitor but not from said node. Moreover, the primary winding of the sensing transformer is switched in series to the capacitor and the secondary winding of the sensing transformer is configured to generate an output signal supplied to the control circuity of the switched converter, wherein the control circuity is configured to sense the current flowing across the output terminals supplying the LED load based on said output signal.

This provides the advantage that the current flowing across the output terminals supplying the LED load can easily and efficiently be implemented independently from the topology of the converter.

In a preferred embodiment, the switched converter further comprises a sampling and hold circuitry configured to sense the output signal and controlled by the control circuitry such that it samples the output signal on phases during which the output terminals for the LED load are only supplied by the capacitor.

This provides the advantage that a well-known circuit such as the sampling and hold circuitry can be used in order to sense the current flowing across the output terminals supplying the LED load.

In a preferred embodiment, the sampling and hold circuitry comprises a FET or diode.

In a preferred embodiment, the sampling and hold circuitry is controlled by a state-machine.

In a preferred embodiment, the control circuitry is further configured to control an operation of the at least one switch in order to perform a feedback control of the current flowing across the output terminals supplying the LED load.

In a preferred embodiment, the switched converter is a resonant converter.

In a preferred embodiment, the switched converter is a non-resonant converter.

In a preferred embodiment, the converter is an isolated converter.

In a preferred embodiment, the converter is a non-isolated converter.

In a preferred embodiment, the switched converter further comprises a flyback converter topology.

This provides the advantage that a well-known topology for the switched converter can be used.

In a preferred embodiment, the switched converter further comprises a LCC converter topology.

This provides the advantage that a well-known topology for the switched converter can be used.

In a preferred embodiment, the switched converter further comprises a LLC converter topology.

This provides the advantage that a well-known topology for the switched converter can be used.

In a preferred embodiment, the switched converter further comprises a buck converter topology.

This provides the advantage that a well-known topology for the switched converter can be used.

In a preferred embodiment, the switched converter further comprises a boost converter topology.

This provides the advantage that a well-known topology for the switched converter can be used.

In a preferred embodiment, the switched converter further comprises a Sepic (single ended primary inductance converter) converter topology.

This provides the advantage that a well-known topology for the switched converter can be used.

In a preferred embodiment, the at least one switch is comprised in a half-bridge topology.

According to a second aspect, the invention relates to a LED lighting module comprising a switched converter according to the first aspect and the implementation forms thereof as well as a LED load supplied by said output terminals of the converter.

The LED lighting module according to the second aspect provides the same advantages as the switched converter according to the first aspect.

According to a third aspect, the invention relates to a method for sensing a current flowing across output terminals of a switched converter supplying an LED load, wherein the switched converter comprises: at least one switch, the output terminals for supplying the LED load, a capacitor arranged in parallel to the output terminals, a sensing transformer, a primary winding of the sensing transformer, a secondary winding of the sensing transformer, comprising the steps of controlling the operation of the at least one switch; operating in alternating cycles between phases of supplying energy from a node on a potential of the at least one switch to the output terminals and phases of supplying energy to output terminals of the capacitor but not from said node, switching the primary winding of the sensing transformer in series to the capacitor;

generating, by the secondary winding of the sensing transformer, an output signal, suppling the output signal to a control circuity of the switched converter; and sensing, by the control circuitry, the current flowing across the output terminals supplying the LED load based on said output signal.

The method according to the third aspect provides the same advantages as the switched converter according to the first aspect.

BRIEF DESCRIPTION OF THE DRAWINGS

The invention will be explained in the followings together with the figures.

DETAILED DESCRIPTION OF THE PREFERRED EMBODIMENTS

Figure 1:
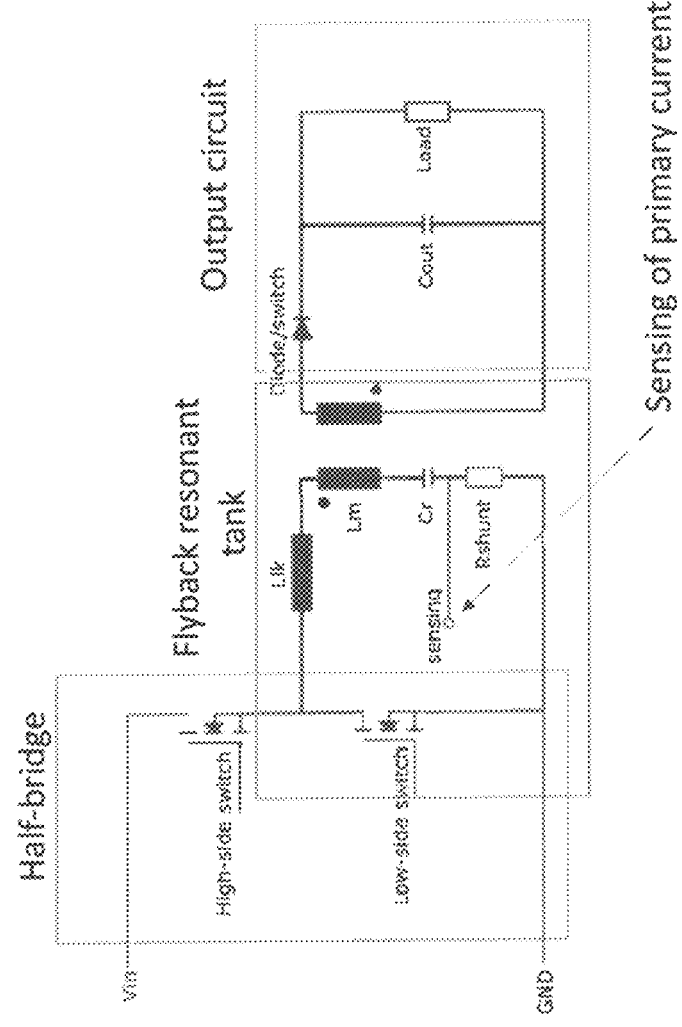
FIG. 1 shows a flyback converter topology according to prior art.

Aspects of the present invention are described herein in the context of a switched converter.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

Figure 2:
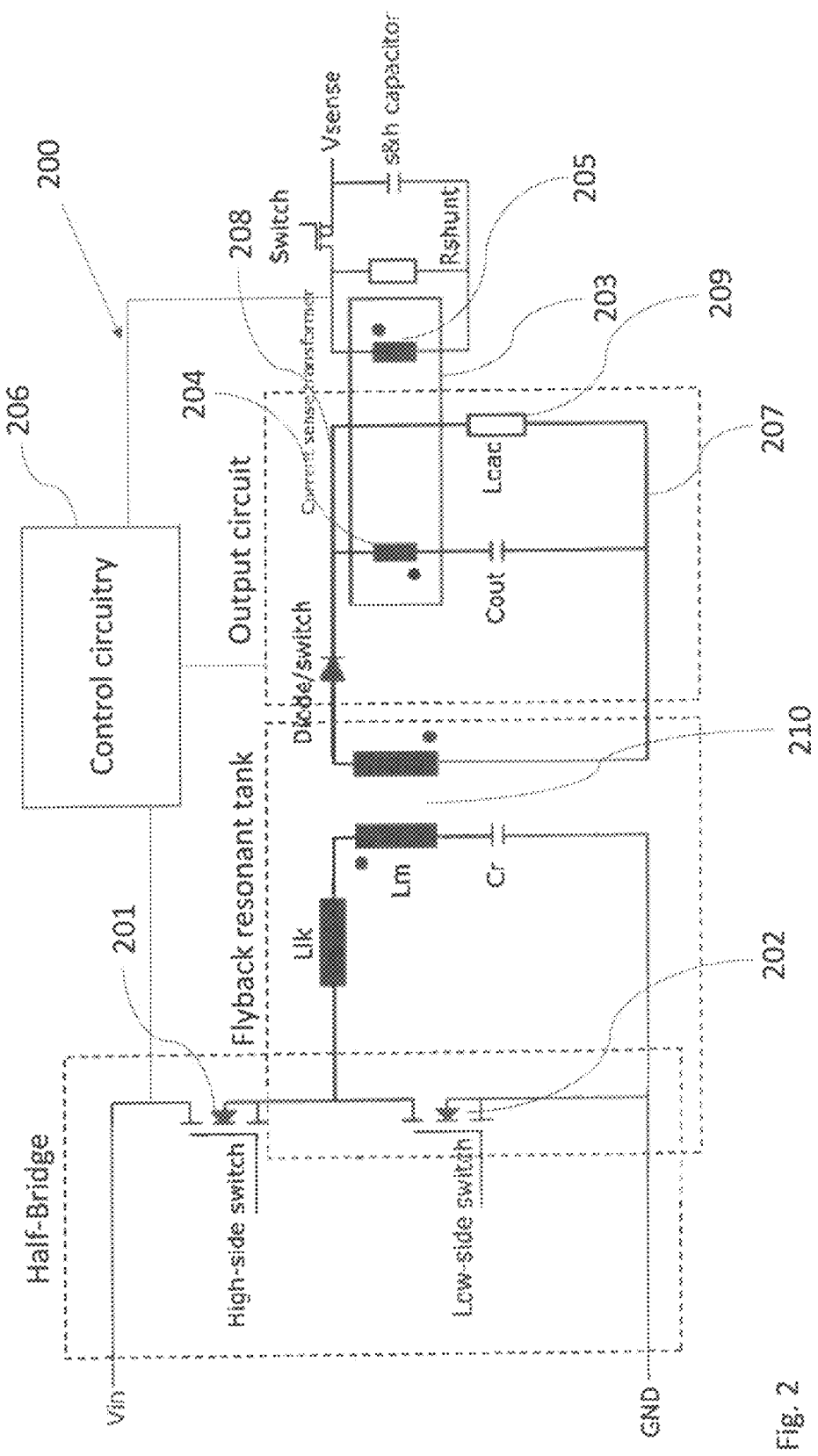
FIG. 2 shows a switched converter according to an embodiment.

Now referring to FIG. 2, a switched converter 200 according to an embodiment is shown.

The switched converter 200 can be divided into three sections: a half-bridge converter (DC/AC converter), a flyback resonant tank, and an output circuitry.

The switched converter 200, comprises: at least one switch 201, 202, output terminals 207, 208 for supplying an LED load 209, a capacitor Cout arranged in parallel to the output terminals 207, 208, a current sensing transformer 203, a primary winding 204 of the sensing transformer 203, a secondary winding 205 of the sensing transformer 203, and a control circuitry 206 configured to control the operation of the at least one switch 201, 202. Moreover, the switched converter 200 is configured to operate in alternating cycles between phases of supplying energy from a node (in the example: midpoint of the switches) on a potential of the at least one switch 201, 202 to the output terminals 207, 208, and phases of supplying energy to output terminals of the capacitor Cout but not from said node.

Furthermore, the primary winding 204 of the sensing transformer 203 is switched in series to the capacitor Cout and the secondary winding 205 of the sensing transformer 203 is configured to generate an output signal supplied to the control circuity 206 of the switched converter 200. Moreover, the control circuity 206 is configured to sense the current flowing across the output terminals 207, 208 supplying the LED load 209 based on said output signal.

The flyback topology shown in FIG. 1 comprises the half-bridge, the resonant tank and the output circuit. The resonant tank is build up by a transformer main inductance Lm, a leakage inductance Llk and a resonance capacitor Cr connected in series to the transformer 210.

As mentioned above, the switched converter 200 has a phase in which the LED load 209 is driven by the storage capacitor Cout, and, in this phase, not from the mains supply Vin. Moreover, the primary winding 204 of the sensing transformer 203 is switched in series to said storage capacitor Cout and, via a synchronized sample-and-hold circuitry, the current flowing from the storage capacitor Cout into the LED load 209, in this specific time period, in which no energy is flowing from the supply voltage of the switched converter 200 to the LED load 209, is measured.

The switched converter 200 can be a resonant, a non-resonant as well as an isolated or non-isolated converter.

The current flowing across the LED load 209 can be sensed via the current sense transformer 203 connected in series to the output capacitor Cout. As there is no DC-component in the output capacitor Cout, a galvanic isolation with the current transformer is achieved. During the low-side switch (LS) 202 on-time, the LED load 209 is supplied with current and the output capacitor Cout is charged by the primary side. During the high-side (HS) 201 on-time, there is no energy transfer from the primary to the secondary side of the switched converter 200. Therefore, during this time period, the LED load 209 is only supplied by the output capacitor Cout. Thus, measuring the current through the output capacitor Cout during the HS on-time will directly correspond to the LED current flowing across the LED load 209. Furthermore, in one embodiment, no diodes are used in the secondary side circuit, so there is no Qrr which may have an impact on the accuracy. The measurement at this specific point in time can be done via an analogue sample and hold circuit managed by a FET and controlled by a state-machine. Optionally, the FET can be replaced by a diode which would result in a peak hold operation.

Summarizing, there is a phase in the operation of the switched converter 200 in which no energy flow into the output capacitor Cout takes place. So, during this phase, the LED load 209 is completely supplied by the output capacitor Cout. Therefore, by measuring the current flowing through Cout with the current sense transformer 203 during this phase, direct information on the LED current 209 can be obtained.

Figure 3:
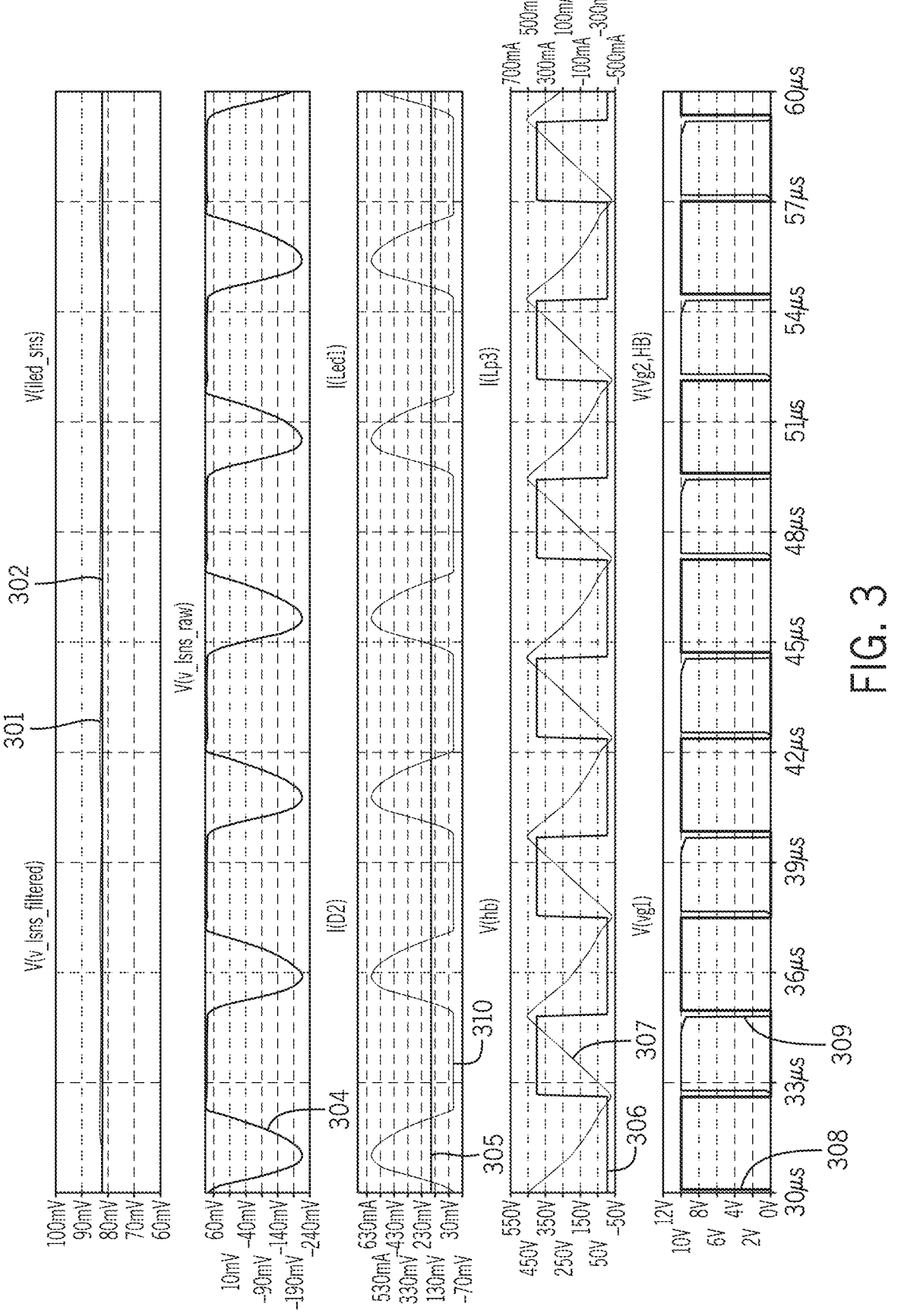
FIG. 3 shows different signals of a switched converter according to an embodiment.

FIG. 3 shows different signals of the switched converter 200 according to an embodiment.

The signal 301 represents the LED current sensed via a direct shunt Rshunt, the line 307 represent the half-bridge (HB) midpoint voltage, the line 302 shows the LED current sensed via an analog sample and hold circuit, the line 306 shows the primary transformer current, the line 304 shows the current through the output capacitor Cout, the line 308 shows the low-side driver signal, the line 305 shows the current through the secondary side diode, the line 309 shows the high-side driver signal, and, finally, the line 310 represents the LED current.

Figure 4:
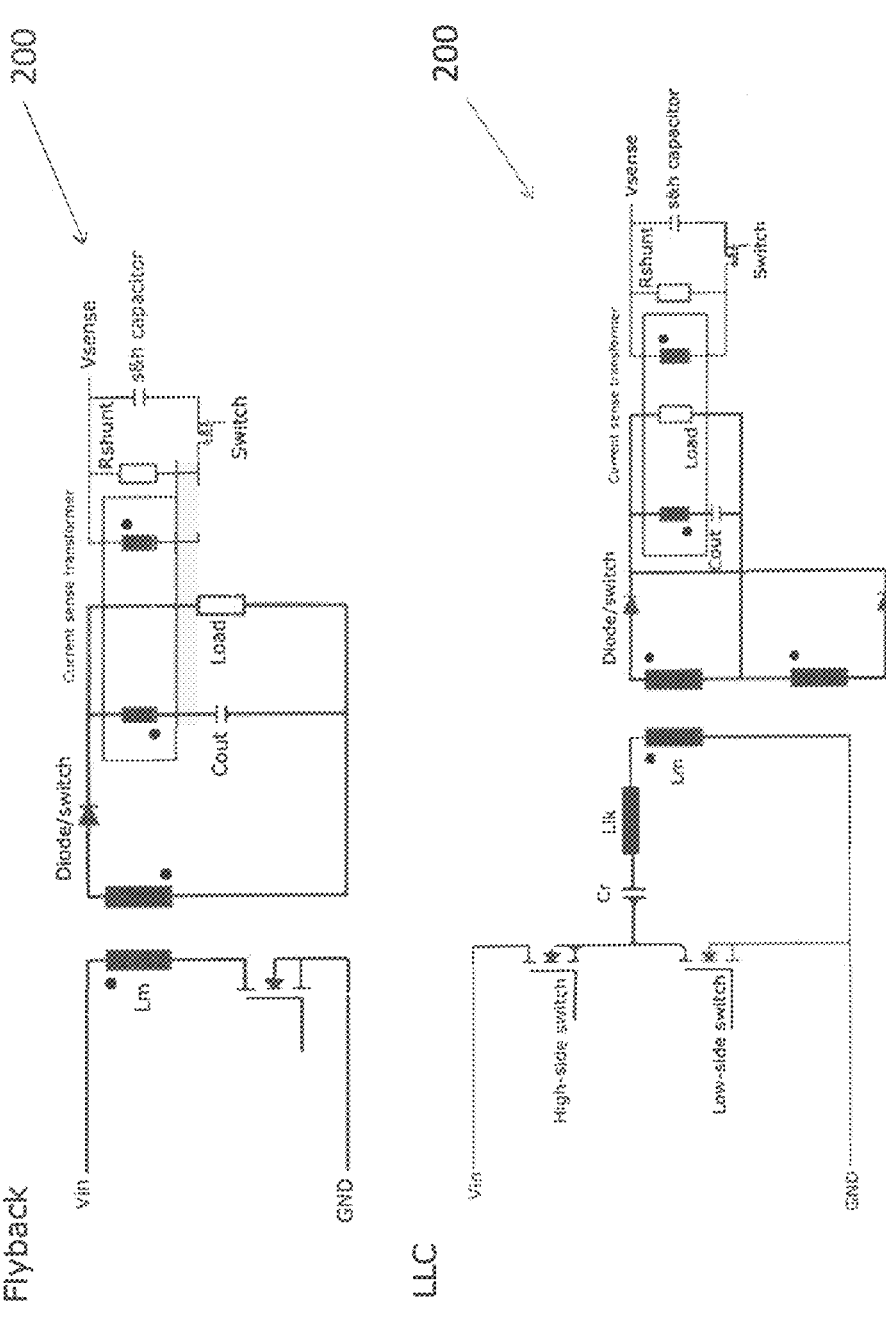
FIG. 4 shows two different converter topologies comprised in a switched converter according to an embodiment.

FIG. 4 shows two different converter topologies comprised in the switched converter 200 according to an embodiment.

In FIG. 4, a flyback and a LLC converter topology are shown.

Figure 5:
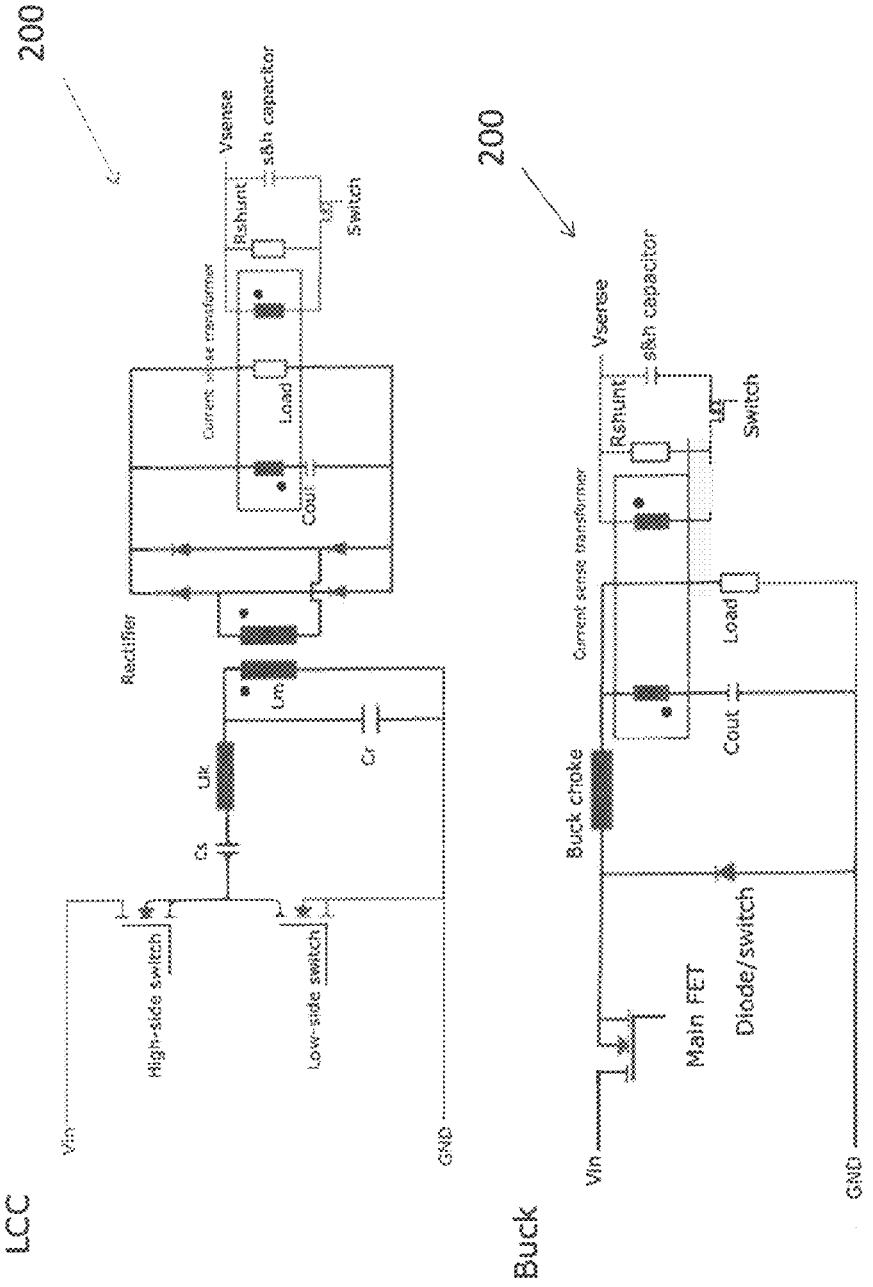
FIG. 5 shows two different converter topologies comprised in a switched converter according to an embodiment.

FIG. 5 shows two different converter topologies comprised in the switched converter 200 according to an embodiment.

In FIG. 5, a LCC and a buck converter topology are shown.

Figure 6:
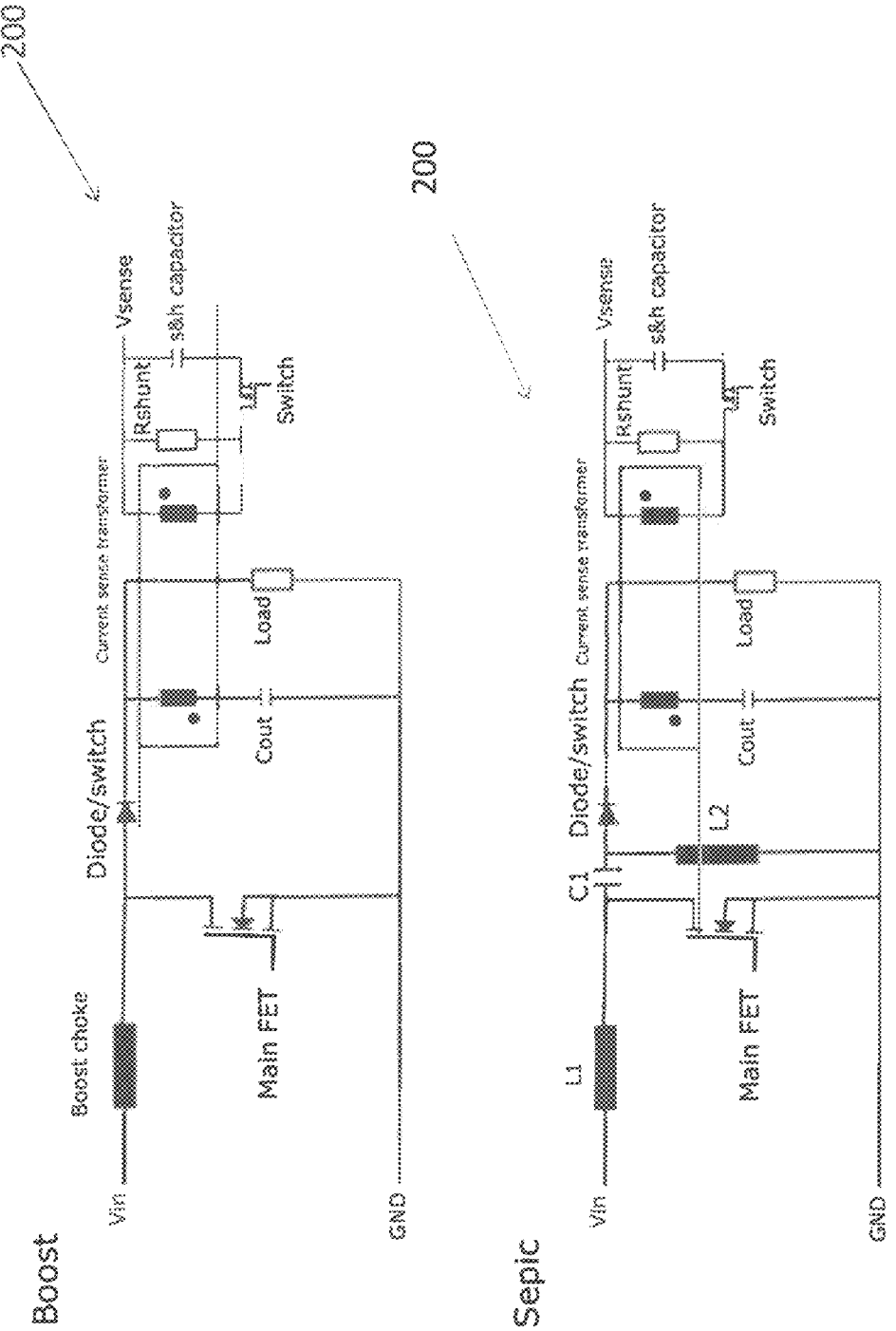
FIG. 6 shows two different converter topologies comprised in a switched converter according to an embodiment.

FIG. 6 shows two different converter topologies comprised in the switched converter 200 according to an embodiment.

In FIG. 6, a boost and a Sepic converter topology are shown.

Figure 7:
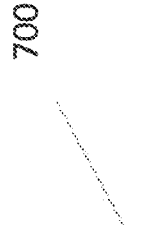
FIG. 7 shows a method for sensing a current flowing across output terminals of a switched converter supplying a LED load according to an embodiment.
Figure 7:
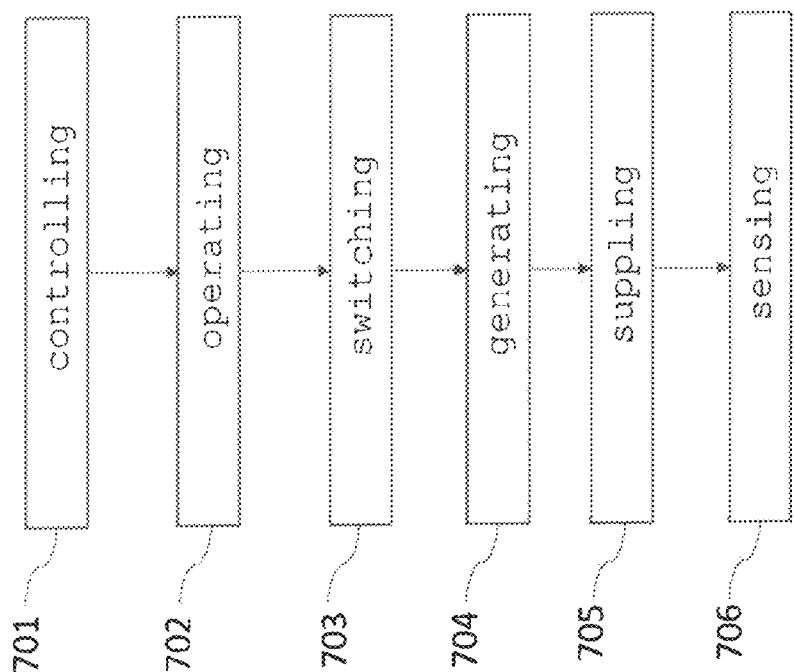

FIG. 7 shows a method 700 for sensing a current flowing across the output terminals 207, 208 of the switched converter 200 supplying the LED load 209 according to an embodiment, wherein the switched converter 200 comprises at least one switch 201, 202, the output terminals 207, 208 for supplying the LED load 209, a capacitor Cout arranged in parallel to the output terminals 207, 208, a sensing transformer 203, a primary winding 204 of the sensing transformer 203, and a secondary winding 205 of the sensing transformer 203.

The method 700 comprises the steps of:

controlling 701 the operation of the at least one switch 201, 202;

operating 702 in alternating cycles between phases of supplying energy from a node on a potential of the at least one switch 201, 202 to the output terminals 207, 208 and phases of supplying energy to output terminals of the capacitor Cout but not from said node;

switching 703 the primary winding 204 of the sensing transformer 203 in series to the capacitor Cout;

generating 704, by the secondary winding 205 of the sensing transformer 203, an output signal;

suppling 705 the output signal to a control circuitry 206 of the switched converter 200;

sensing 706, by the control circuitry 206, the current flowing across the output terminals 207, 208 supplying the LED load 209 based on said output signal.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

The invention claimed is:

1. A switched converter, comprising:

at least one switch;

output terminals for supplying a light emitting diode load (LED load);

an output capacitor (Cout) arranged in parallel to the output terminals;

a current sensing transformer having a primary winding and a secondary winding, and a control circuitry configured to control the operation of the at least one switch, wherein the switched converter is configured to operate in alternating cycles between phases of supplying energy from a node on a potential of the at least one switch to the output terminals for supplying the LED load and for charging the output capacitor (Cout) and phases of supplying energy to output terminals for supplying the LED load from the output capacitor (Cout) but not from said node, wherein the primary winding of the current sensing transformer is connected in series to the output capacitor (Cout) and parallel to said output terminals, and the secondary winding of the current sensing transformer is configured to generate a sensor output signal supplied to the control circuitry of the switched converter, wherein the control circuitry is configured, during phases in which energy is supplied to the output terminals from the output capacitor (Cout) but not from said node, to sense the current flowing from the output capacitor (Cout) across the output terminals and through the LED load based on said sensor output signal.

2. The switched converter of claim 1, wherein the switched converter (200) further comprises a sampling and hold circuitry configured to sense the sensor output signal and controlled by the control circuitry such that it samples the sensor output signal in phases during which the output terminals for the LED load are only supplied by the output capacitor (Cout).

3. The switched converter of claim 2, wherein the sampling and hold circuitry comprises a field-effect transistor or diode.

4. The switched converter of claim 2, wherein the sampling and hold circuitry is controlled by a state-machine.

5. The switched converter of claim 1, wherein the control circuitry is further configured to control an operation of the at least one switch in order to perform a feedback control of the current flowing across the output terminals supplying the LED load.

6. The switched converter according to claim 1, wherein the switched converter is a resonant converter.

7. The switched converter of claim 1, wherein the switched converter is an isolated converter.

8. The switched converter of claim 1, wherein the switched converter further comprises a flyback converter topology.

9. The switched converter of claim 1, wherein the switched converter further comprises an inductor-inductor-capacitor converter topology.

10. The switched converter of claim 1, wherein the switched converter further comprises a buck converter topology.

11. The switched converter of claim 1, wherein the switched converter further comprises a boost converter topology.

12. The switched converter of claim 1, wherein the switched converter further comprises a (Single-Ended, Primary-Inductor Converter topology (a SEPIC converter).

13. The switched converter of claim 1, wherein the at least one switch is comprised in a half-bridge topology.

14. A light emitting diode lighting module comprising a switched converter according to claim 1 as well as a light emitting diode load supplied by said output terminals of the switched converter.

15. A method for sensing a current flowing across output terminals of a switched converter supplying a light emitting diode load (LED load), wherein the switched converter comprises: at least one switch, the output terminals for supplying the LED load, an output capacitor (Cout) arranged in parallel to the output terminals, a current sensing transformer, a primary winding of the current sensing transformer, a secondary winding of the current sensing transformer, wherein the primary winding of the current sensing transformer is connected in series to the output capacitor (Cout);

the method comprising the steps of:

controlling the operation of the at least one switch;

operating in alternating cycles between phases of supplying energy from a node on a potential of the at least one switch to the output terminals for supplying the LED load and for charging the output capacitor (Cout) and phases of supplying energy to the output terminals for supplying the LED load from the output capacitor but not from said node, characterized by the steps of:

generating, by the secondary winding of the current sensing transformer, a sensor output signal;

supplying the sensor output signal to a control circuitry of the switched converter; and during phases in which energy is supplied to the output terminals from the output capacitor (Cout) but not from said node, sensing, by the control circuitry, the current flowing from the output capacitor (Cout) across the output terminals supplying the LED load based on said sensor output signal.

16. A method for sensing a current flowing across output terminals of a switched converter supplying the light emitting diode load (the LED load) as recited in claim 15 further comprising the following steps:

during phases in which energy is supplied to the output terminals from said node in order to supply the LED load and charge the output capacitor (Cout), indirectly sensing the current flowing across the output terminals supplying the LED load using a shunt resistor on a primary side of the converter.

* * * * *